US010502491B2

(12) United States Patent
Hutmacher et al.

(10) Patent No.: US 10,502,491 B2
(45) Date of Patent: Dec. 10, 2019

(54) SEALING VALVE ARRANGEMENT FOR A SHAFT FURNACE CHARGING INSTALLATION

(71) Applicant: PAUL WURTH S.A., Luxembourg (LU)

(72) Inventors: Patrick Hutmacher, Bettembourg (LU); Yves Heinen, Huldange (LU); Charles Steichen, Schlindermanderscheid (LU); Harald Lang, Trier (DE); Paul Tockert, Berbourg (LU)

(73) Assignee: PAUL WURTH S.A., Luxembourg (LU)

( * ) Notice: Subject to any disclaimer, the term of this patent is extended or adjusted under 35 U.S.C. 154(b) by 88 days.

(21) Appl. No.: 15/763,384

(22) PCT Filed: Sep. 6, 2016

(86) PCT No.: PCT/EP2016/070934
§ 371 (c)(1),
(2) Date: Mar. 26, 2018

(87) PCT Pub. No.: WO2017/050560
PCT Pub. Date: Mar. 30, 2017

(65) Prior Publication Data

US 2018/0266768 A1 Sep. 20, 2018

(30) Foreign Application Priority Data

Sep. 25, 2015 (LU) .......................................... 92837

(51) Int. Cl.
*F16K 31/44* (2006.01)
*C21B 7/12* (2006.01)
(Continued)

(52) U.S. Cl.
CPC ............ *F27D 99/0073* (2013.01); *C21B 7/20* (2013.01); *F27B 1/20* (2013.01)

(58) Field of Classification Search
CPC ..... C21B 7/12; C21B 7/18; C21B 7/20; F27B 1/20; F27B 1/21; F27D 3/10; F27D 2003/105; F16K 31/44; F16K 31/52
See application file for complete search history.

(56) References Cited

U.S. PATENT DOCUMENTS

| | | | | |
|---|---|---|---|---|
| 4,071,166 A | | 1/1978 | Legille et al. | |
| 4,288,060 A | * | 9/1981 | Mittell .................... | F16K 31/44 251/215 |

(Continued)

FOREIGN PATENT DOCUMENTS

| | | | |
|---|---|---|---|
| CN | 203374824 | U | 1/2014 |
| WO | 2010015721 | A1 | 2/2010 |
| WO | 2011000966 | A1 | 1/2011 |

OTHER PUBLICATIONS

International Search Report dated Oct. 18, 2016 re: Application No. PCT/E2016/070934, pp. 1-3.

(Continued)

*Primary Examiner* — Gregory A Wilson
(74) *Attorney, Agent, or Firm* — Cantor Colburn LLP

(57) ABSTRACT

A sealing valve arrangement for a shaft furnace charging installation, said arrangement comprising: a shutter arranged for cooperating with a valve seat; an integrated dual-motion shutter-actuating device for moving said shutter between a sealed closed position in sealing contact with the valve seat and an open position remote from the valve seat, said integrated dual-motion shutter-actuating device comprising: a primary motion assembly for moving said shutter from said sealed closed position to an undamped position wherein the shutter is released from the valve seat; a secondary motion assembly for tilting said shutter from said undamped position to said open position remote from the valve seat, said secondary motion assembly comprising a tilting arm carrying said shutter and connected to a tilting shaft that (Continued)

defines an axis of rotation and a tilting shaft actuator configured to impart an angular rotation about said axis to said tilting arm; wherein said integrated dual-motion shutter-actuating device further comprises a stationary outer cylindrical sleeve, wherein said primary motion assembly comprises an inner eccentric sleeve shaft rotationally mounted within said outer cylindrical sleeve and a primary motion actuator configured to impart angular rotation to said inner eccentric sleeve shaft, the primary motion being a function of the eccentricity and angular rotation of the inner eccentric sleeve shaft; and wherein said tilting shaft of said secondary motion assembly is rotationally mounted within said inner eccentric sleeve shaft of said primary motion assembly, the secondary motion being a function of the angular rotation of the tilting shaft.

7 Claims, 5 Drawing Sheets

(51) Int. Cl.

| | |
|---|---|
| ***F27D 99/00*** | (2010.01) |
| ***F27B 1/20*** | (2006.01) |
| ***C21B 7/20*** | (2006.01) |

(56) References Cited

U.S. PATENT DOCUMENTS 4,306,828 A * 12/1981 Legille .................... C21B 7/18 414/199
4,514,129 A 4/1985 Legille et al.
4,755,095 A 7/1988 Mailliet et al.
4,986,516 A * 1/1991 Lonardi .................... C21B 7/18 266/87
5,246,208 A * 9/1993 Mailliet .................... C21B 7/12 266/271
8,568,653 B2 * 10/2013 Thillen .................... C21B 7/18 266/197

OTHER PUBLICATIONS

Written Opinion dated Oct. 18, 2016 re: Application No. PCT/E2016/070934, pp. 1-6.
KR Office Action dated May 10, 2018 re: Application No. 10-2018-7009384, pp. 1-10.

* cited by examiner

Fig. 4A2
Fig. 4A1
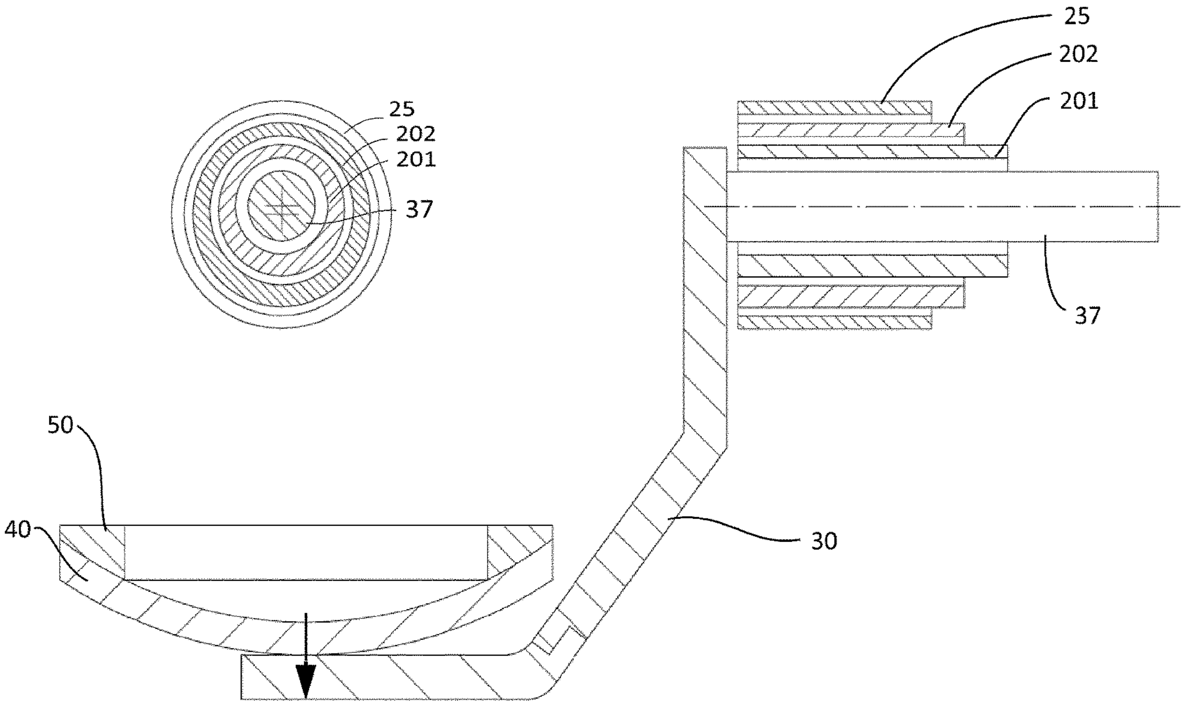
Fig. 4B2
Fig. 4B1
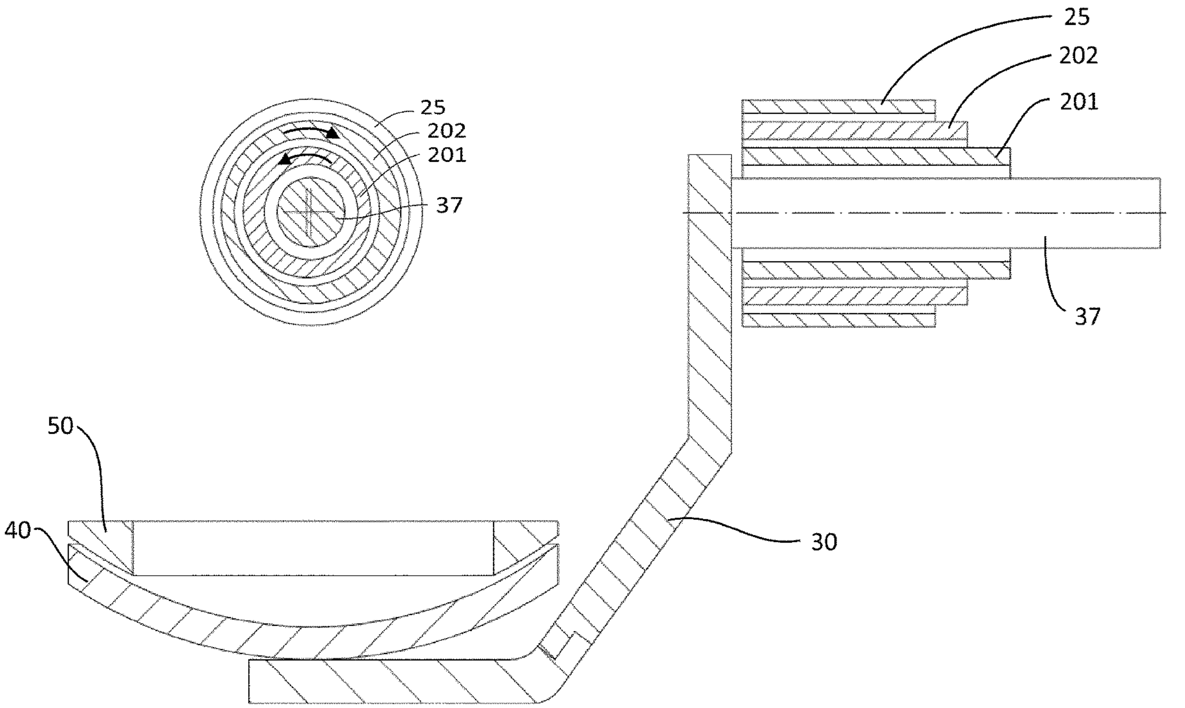

Fig. 5
A
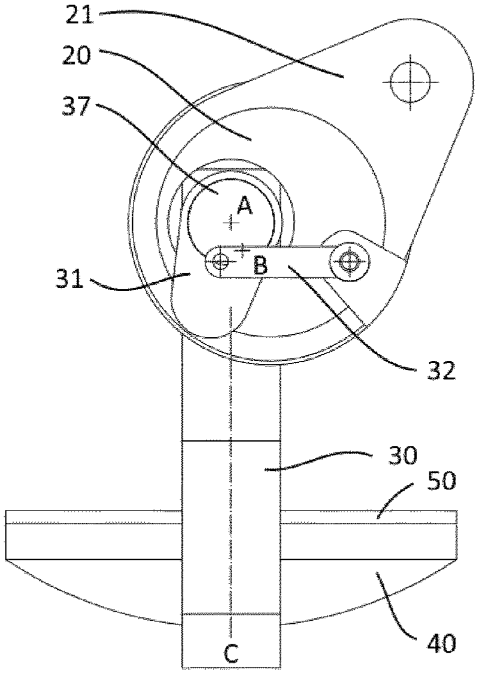
B
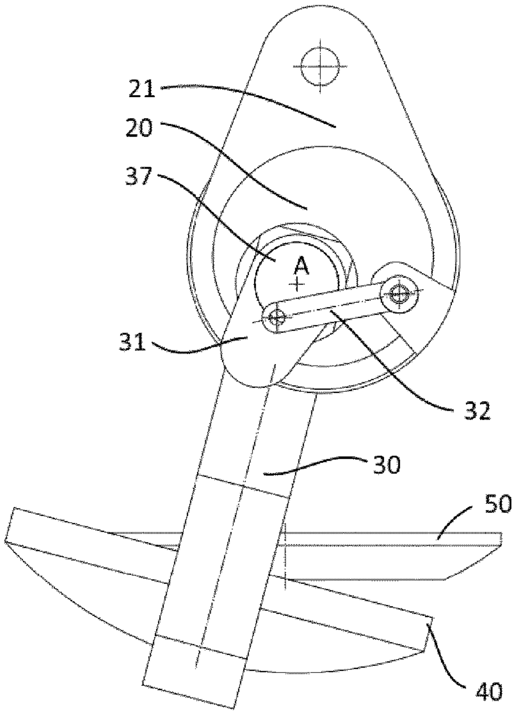
C
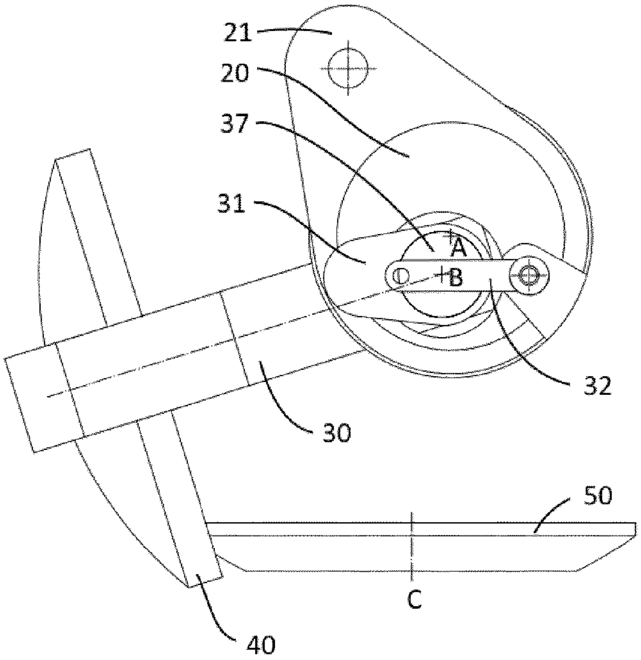

SEALING VALVE ARRANGEMENT FOR A SHAFT FURNACE CHARGING INSTALLATION

TECHNICAL FIELD

The present disclosure generally relates to a sealing valve arrangement for a shaft furnace charging installation and more specifically to an upper or lower sealing valve arrangement for preventing furnace gas loss in a blast furnace charging installation.

BACKGROUND

Shaft furnace charging installations of the BELL LESS TOP® type have found widespread use in industry during the last decades. An early example of such an installation is disclosed e.g. in U.S. Pat. No. 4,071,166. This installation minimizes escape of blast furnace gas from the furnace throat by operating one or more intermediate charge material storage hoppers in the manner of a sluice or airlock. To this effect, each hopper has an upper sealing valve and a lower sealing valve for sealing closure of the hopper inlet and outlet respectively. During filling of the hopper, the upper sealing valve is open whilst the lower sealing valve is closed. When material is charged from the hopper into the furnace, the lower sealing valve is open whilst the upper sealing valve is closed. U.S. Pat. No. 4,071,166 discloses a commonly used sealing valve arrangement with a flap-type valve, in which the shutter is tiltable about a single shaft. The axis of this shaft is arranged approximately in the plane of the valve seat. Since the shutter has to be completely removed from the material flow path in the open position, the arrangement according to U.S. Pat. No. 4,071,166 requires considerable space in the vertical direction, both inside the lower sealing valve housing and inside each intermediate storage hopper (see e.g. FIG. 1 of this patent). In other words, this valve arrangement requires a certain free height inside the sealing valve housing and limits the maximum filling height of the hoppers.

In order to reduce "lost" vertical constructional space, improved so-called dual-motion shutter-actuating devices have been proposed. U.S. Pat. No. 4,514,129 proposes such a dual-motion shutter-actuating device. This device is configured to tilt the valve about a first axis and to separately pivot the shutter together with its mounting arm about a second axis that is perpendicular to the first axis. This dual-motion shutter-actuating device allows moving the shutter into a higher parking position located laterally of and partially above the seat. The valve arrangement according to U.S. Pat. No. 4,514,129 thereby considerably reduces the required constructional height. U.S. Pat. No. 4,755,095 discloses a similar shutter-actuating device in an upper sealing valve arrangement, i.e. for sealing the inlet of the hopper. A drawback of these types of shutter-actuating devices however lies in that they have a number of articulated parts prone to wear and exposed to harsh conditions.

WO 2010/015721 A1 describes a further dual-motion lower sealing valve assembly for a shaft furnace charging installation comprising a lower sealing valve housing with a valve seat. The shutter is adapted to cooperate with the valve seat and operatively connected to a valve actuation mechanism, which can be supported by the top plate of the lower sealing valve housing, for moving the shutter into and out of sealing contact with the valve seat. In particular, the valve actuation mechanism comprises a turn-slide cylindrical joint supporting the shutter. The cylindrical joint has a substantially vertical joint axis according to which the joint allows translating the shutter up and down, e.g. in vertical direction, and in a plane perpendicular to which the joint allows swiveling the shutter, typically in a substantially horizontal plane. The turn-slide cylindrical joint comprises: a shaft, acting as output shaft of the joint, an intermediate hollow sleeve, in which the shaft is mounted, and an outer shell, supporting the sleeve and forming the fixed frame of the joint. The shaft is axially fixed and rotatable about the joint axis in the hollow sleeve. The sleeve is axially slidable along the joint axis in the outer shell that is fixed to the housing. The mechanism further comprises a first hydraulic cylinder for axial translation (sliding) and a second hydraulic cylinder for rotation (turning). The first cylinder has one side connected to the outer shell and the other side connected to the hollow sleeve, for axially translating the shaft with the sleeve along the joint axis relative to the shell. The second hydraulic cylinder has one side hinged to the sleeve and the other side hinged to the shaft in order to rotate the shaft relative to the intermediate sleeve about the joint axis. However, again, due to the fact that the translational movement is done in a dusty environment, the life time of the mechanism is shortened due to the fact that during actuation, dust may enter the seals and damage the sealing surfaces. A further disadvantage of this solution is the fact that particles falling on the shutter cannot fall down.

WO 2011/000966 A1 discloses a still further dual-motion shutter-actuating device is of the type configured to confer to the shutter a superposition of two rotations about substantially parallel and offset axes, i.e. offset axes having a relative orientation closer to parallel than to perpendicular. To this effect, the device comprises a primary tilting arm supported on a first tilting shaft, which is equipped with bearings to rotatably support the primary tilting arm on a stationary structure, typically either a lower sealing valve housing or on the shell of an intermediate storage hopper, in rotatable manner about an immobile first axis; a secondary tilting arm that carries the shutter and is supported on a second tilting shaft, which is equipped with bearings that rotatably support the secondary tilting arm on the primary tilting arm, in rotatable manner about a second axis that is essentially parallel to the first axis and moves with the secondary tilting arm; and a mechanism configured to impart rotation about the second axis to the secondary tilting arm at the same time as the primary tilting arm rotates about the first axis. In this solution, the first tilting shaft is configured as hollow sleeve shaft and the shutter-actuating device comprises a reference rod that extends through the first tilting shaft. This reference rod has a distal end portion to be connected to a stationary structure and a proximal end portion with a reference member, the mechanism having a driven side that is in engagement with the reference member. The main disadvantage of this solution is the number of movable parts, which render the device more costly in terms of manufacturing and assembling. Finally, the mechanism is to be operated inside a dusty environment although covered against dust.

BRIEF SUMMARY

In view of the above, the present disclosure provides a sealing valve arrangement with a shutter-actuating device that combines reduced construction height with reduced number of movable parts, preferably a reduced number of movable parts directly exposed to harsh conditions.

The present disclosure proposes in a first aspect a sealing valve arrangement, especially for lower or upper sealing valve arrangements for a charging installation of a shaft furnace, such as a blast furnace. The sealing valve arrangement comprises a shutter arranged for cooperating with a valve seat of a sealing valve and an integrated dual-motion shutter-actuating device for moving said shutter between a sealed closed position in sealing contact with the valve seat and an open position remote from the valve seat, preferably located laterally thereof. In said open position, the passage or material flow path through the sealing valve is entirely cleared by the shutter.

The integrated dual-motion shutter-actuating device comprises:

- a primary motion assembly for moving said shutter from said sealed closed position to an unclamped or unsealed position wherein the shutter is released from the valve seat; and
- a secondary motion assembly for tilting said shutter from said unclamped or unsealed position to said open position remote from the valve seat, said secondary motion assembly comprising a tilting arm attached to said shutter and connected to a tilting shaft that defines an axis of rotation and a tilting shaft actuator configured to impart an angular rotation about said axis to said tilting arm.

According to the present disclosure, said integrated dual-motion shutter-actuating device further comprises a stationary outer cylindrical sleeve. The primary motion assembly comprises an inner eccentric sleeve shaft (first eccentric sleeve shaft) rotationally mounted within said outer cylindrical sleeve and a primary motion actuator configured to impart angular rotation to said inner eccentric sleeve shaft, the primary motion being a function of the eccentricity and angular rotation of the inner eccentric sleeve shaft. Furthermore, said tilting shaft of said secondary motion assembly is rotationally mounted within said inner eccentric sleeve shaft of said primary motion assembly, the secondary motion being a function of the angular rotation of the tilting shaft.

The main advantage of the disclosure is that all parts responsible for both primary and secondary motions of the shutter, i.e. the unclamping from the valve seat and the tilting away of the shutter in a parking position are done with an assembly having only very few and constructionally simple parts, which are moreover easily serviceable and protectable against dust and temperature.

As indicated above, the primary motion, in particular the distance and path by which the shutter is moved during this primary motion, is a function of the eccentricity and angular rotation of the inner eccentric sleeve shaft. An eccentric sleeve shaft in the context of the disclosure generally resembles a conventional sleeve shaft, i.e. a shaft with a central longitudinal (coaxial) bore to hold e.g. a further shaft, except that the center of the bore is not central or coaxial, but rather shifted or offset (off-center) by a distance with respect to central axis of the sleeve shaft. This offset distance, also termed eccentricity, will determine the maximum extent of the primary movement, i.e. the maximum distance the shutter may be moved away from the valve seat. As will be further exemplified below, this maximum distance is twice the eccentricity if the eccentric sleeve shaft is rotated by 180°. Hence, by rotating the inner eccentric sleeve shaft from a position where the eccentricity position (position of the offset center of the bore or center of the shaft placed in said bore) is in a vertically uppermost eccentricity position (shutter closed) by 180° to its lowermost position, the shutter may be entirely unclamped by a distance twice the eccentricity. Hence, by appropriately choosing the eccentricity, the shutter may be unclamped and moved far enough from the valve seat to be tilted away by the secondary tilting motion. This secondary tilting motion simply requires rotating the shaft within the eccentric bore by a sufficient angle.

It has been observed however that at least for a number of applications, wear of the valve seat and gasket is increased to an undesirable extent, if the initial unclamping of the shutter from the valve seat implies movements off-parallel to the valve seat's central axis.

Hence, in a further embodiment, the inner eccentric sleeve shaft is arranged within the outer cylindrical sleeve such that the eccentricity position is located laterally by about the eccentricity distance from the center of the outer cylindrical sleeve when the shutter is in the sealed closed position. In other words, in such an embodiment, the primary motion does not start from a vertically uppermost eccentricity position, but rather from a situation where the position of the eccentric sleeve shaft is rotated by 90° with respect to the uppermost vertical position.

Remarkably, such a configuration provides an advantageous initial component of the primary motion which is almost parallel to the axis of the valve seat, thereby allowing a comparatively gentle, wear reducing unclamping operation. In such configurations, the primary motion will imply that the inner eccentric sleeve preferably is rotated by an angle of 90°, which moves the shutter by vertical and horizontal distances equal to the eccentricity.

Hence, even the use of only one eccentric sleeve shaft for the primary motion allows for an initially almost translational unclamping. This means that at the beginning of the opening, the movement provided by the eccentric is such that the shutter is lifted from the seat with an almost straight path, essentially parallel to the axis of the valve seat.

If desired or necessary, the translational part of the primary motion may even be enhanced by a further constructionally simple variant of the sealing valve arrangement of the disclosure.

In such a further embodiment, the primary motion assembly further comprises an outer eccentric sleeve shaft (second eccentric sleeve shaft) rotationally mounted within said outer cylindrical sleeve, wherein said inner eccentric sleeve shaft (first eccentric sleeve shaft) is rotationally mounted within said outer eccentric sleeve shaft (second eccentric sleeve shaft), the primary motion being a function of the eccentricity and angular rotation of both inner and outer eccentric sleeve shafts.

By combining two nested (first and second) eccentric sleeve shafts, each one being rotationally movable, the primary motion can be adjusted again as a function of the eccentricity and angular rotation, but this time, of those of the inner and of the outer eccentric sleeve shaft. Their eccentricity and their rotation angle may be adapted independently to best fit the actual situation and the objectives set by the operator. As it will be easily understood with the examples provided below, the allowable maximum (net) distance will be twice the sum of both eccentricities if both eccentric sleeve shafts are rotated by 180°.

However, a double eccentric sleeve shaft assembly further allows a primary motion which may be particularly advantageous or desirable in certain situations. Hence, in a still further embodiment with two eccentric sleeve shafts, the inner and outer (first and second) eccentric sleeve shafts have the same eccentricity. Furthermore, an eccentric actuator is preferably configured to impart a simultaneous counter-rotating angular rotation to said inner and outer eccentric sleeve shafts. In fact, by combining the same eccentricity and simultaneous counter-rotating by the same angle of both (inner and outer) eccentric sleeve shafts, the primary motion becomes entirely translational without lateral shifting at any time during the primary motion, i.e. the path of the shutter during primary motion is entirely straight.

The primary and secondary motion may be effected by an appropriate number of separate actuators. In general, the use of one actuator per motion assembly will allow a convenient control without adding undue complexity to the sealing valve arrangement. Nevertheless, it might be desirable or necessary to further reduce the number of parts of a sealing arrangement as described herein.

Hence, in a still further embodiment, the tilting shaft actuator may be a control rod used to concomitantly rotate the tilting shaft with the rotation of the inner (or outer) eccentric. In one embodiment such a control rod is rotationally connected with one end to a stationary point and with the other to the tilting shaft or to a crank associated therewith, such that the rotating of the eccentric (primary motion) with an actuator, such as a hydraulic jack or similar, drives the rotation of the tilting shaft (secondary motion) by means of the control rod.

In the context of the disclosure, it is to be understood that a greater number of nested eccentric sleeve shafts can be used if desired or deemed useful. In general however, the complexity of the assembly and especially of the actuation mechanism rapidly increases with higher numbers of eccentric sleeves.

In a still further embodiment, the secondary motion of tilting the shutter to its parking position could be further assisted or completed by concomitantly or subsequently to the secondary tilting motion also rotating the eccentric sleeve shaft (or any or more of them if present) by a further angle. For example, by rotating the eccentricity position(s) of the eccentric sleeve shaft(s) to the side of the parking position, the shutter may be placed still further away from the center of the valve as it would by only the secondary motion.

Although above only the shutter opening operation has been described, it is clear to the skilled person that closing the shutter basically implies reverting the steps described for opening, it being understood that slightly departing from the exact reverse order may be considered if desired.

The tilting arm preferably is a cantilever arm that is supported at one end portion by said tilting shaft inside the inner eccentric sleeve shaft and at another end portion carries the shutter. The shutter may be of any appropriate type, preferably the shutter is a conical, spherical, parabolic or flap type valve shutter.

Preferably, the one or more eccentric sleeve shafts, as well as the tilting shaft within the integrated dual-motion shutter-actuating device are rotationally mounted with axially spaced bearings.

With the disclosure a number of advantages can be achieved compared to existing solutions, among which the most important benefits are:

- During the opening of the shutter, particles on the shutter can fall off due to the tilting motion.
- Due to the fact the integrated dual-motion shutter-actuating device is working only with rotational movements, the gas tightness can easily be achieved with axial shaft gaskets. For comparison, a translational movement of a cylinder in a dusty environment has a short life time due to the fact that during actuation, dust is constantly entering the seals and damaging the sealing surfaces.
- There is no loss of working height during opening motion of the shutter.

- The major part of the mechanism can easily be placed outside of the valve casing.
- With one eccentric sleeve shaft a constructionally simple solution can be provided which fits most situations, especially when primary motion starts with only a vertical component (axes A and B in a same horizontal plane, see also FIGS. 1 and 3).
- With two eccentric sleeve shafts, the tilting arm is pivot-mounted in the inner eccentric sleeve shaft. The inner eccentric sleeve shaft is pivot mounted in the outer eccentric sleeve shaft. The outer eccentric shaft is pivot-mounted in the outer sleeve or casing. With two eccentric sleeve shafts with opposite eccentricity position and equal eccentricity a uniform and purely translational movement (horizontal/vertical) of a shutter can be realized when both eccentric sleeve shafts are actuated simultaneously in opposite directions during the unclamping/clamping motion.

BRIEF DESCRIPTION OF THE DRAWINGS

A preferred embodiment of the disclosure will now be described, by way of example, with reference to the accompanying drawings in which:

FIG. 4A1-B2 is a series of cross sectional views of a third embodiment of a valve sealing arrangement showing the integrated dual-motion shutter-actuating device with two eccentric sleeve shafts; and FIG. 5A-C is a series of back views of a fourth embodiment of a valve sealing arrangement showing the integrated dual-motion shutter-actuating device with one eccentric sleeve shaft of an alternative actuator arrangement with one primary motion actuator and a tilting control rod.

Further details and advantages of the present disclosure will be apparent from the following detailed description of several not limiting embodiments with reference to the attached drawings.

DETAILED DESCRIPTION

Figure 1A:
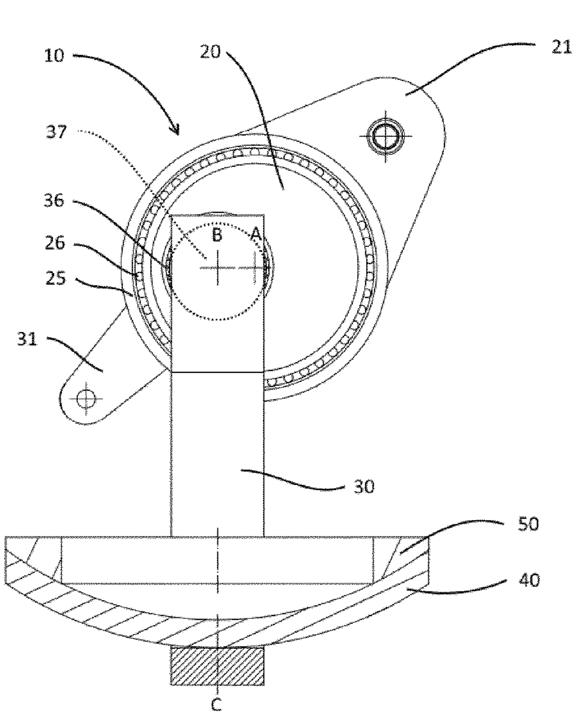
FIG. 1A-C is a series of partial vertical cross sectional views of a first embodiment of a valve sealing arrangement showing the integrated dual-motion shutter-actuating device with one eccentric sleeve shaft.
Figure 1B:
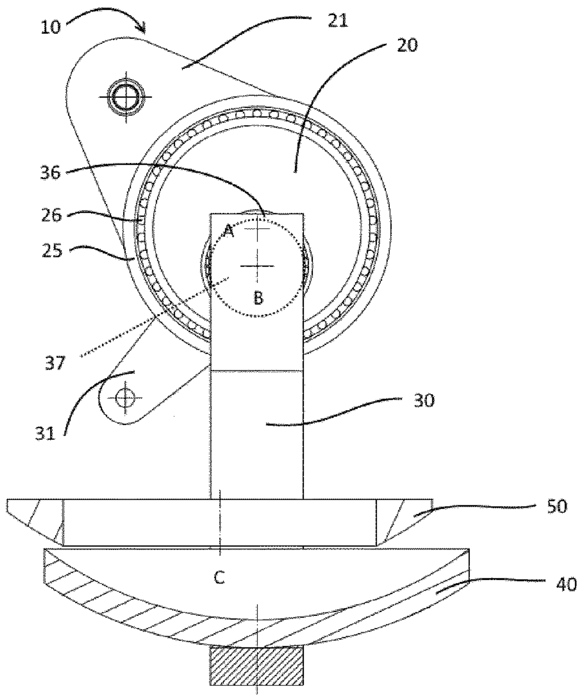
Figure 1C:
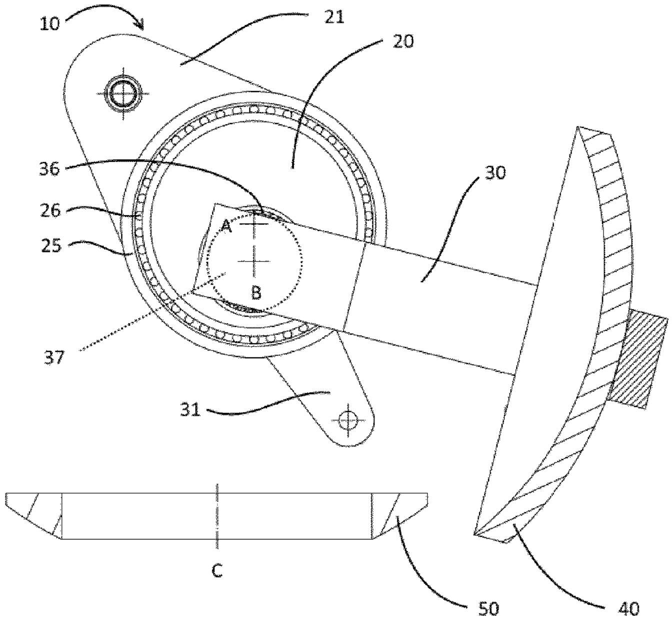

FIG. 1A-C is a series of partial vertical cross sectional views of a first embodiment of a valve sealing arrangement 10 showing the integrated dual-motion shutter-actuating device with one inner eccentric sleeve shaft 20. In FIG. 1A, the shutter 40 mounted on one end of the tilting arm 30 is in the closed position firmly seated on valve seat 50. The integrated dual-motion shutter-actuating device comprises a stationary outer cylindrical sleeve 25 in which an inner eccentric sleeve shaft 20 is rotationally mounted with means of bearings 26. The inner eccentric sleeve shaft 20 can be rotated around central axis A by means of eccentric crank 21 to which it is connected.

Within the offset bore of the inner eccentric sleeve shaft 20 the cylindrical shaft connected at one end to tilting arm 30 and at the other end to tilting crank 31 is mounted with means of bearings 36 to rotate about axis B when tilting crank 31 is actuated.

The eccentricity in the embodiment of FIG. 1A-C is the distance between centers A and B. As a non-limiting example, in common sealing valve arrangements, the eccentricity will generally be chosen to be between 50 and 200 mm, preferably between 80 and 120 mm. In the closed position in FIG. 1A axis B is located in a vertical plane perpendicular to tilting direction comprising axis C of sealing valve (seat) 50. Stationary axis A is situated laterally from movable axis B (also called eccentricity position herein).

The primary motion is effected by rotating eccentric sleeve shaft 20 by moving eccentric crank 21 from the position shown in FIG. 1A to that in FIG. 1B. At the very beginning of the unclamping motion, shutter 40 moves almost vertically down, essentially parallel to the axis C of the valve seat (see also description of FIG. 2 below). The extent of the initial almost vertical distance can be controlled by the eccentricity, the larger the eccentricity the greater the almost straight initial distance. In fact, in practice, the most important moment in terms of wear of the seat and gasket are the first few millimeters of the primary motion. Indeed, in common cases, the gaskets are firmly compressed in the sealed closed position of the shutter. Such gaskets have heights of compressibility of a few millimeters, such as approximately 3 mm. So if in such a case the shutter has been lowered by these 3 mm from the seat, there is no more contact between shutter and seat and thus the subsequent motion can be chosen more freely. During the primary motion, eccentric sleeve shaft 20 is turned by an angle of 90° counterclockwise and the path of moving axis B (and thus of the shutter) is a quadrant with a radius equal to the eccentricity until axis B is below axis A in FIG. 1B. Shutter 40 is now at a distance from the valve seat which is sufficient to start the secondary motion of tilting the tilting arm 30 with shutter 40 to a lateral parking position as illustrated in FIG. 1C.

The tilting operation (secondary motion) is effected by rotating the tilting shaft around axis B by means of an actuator (not represented) turning tilting crank 31 counterclockwise at a sufficient angle to clear the passage of the valve.

Figure 2:
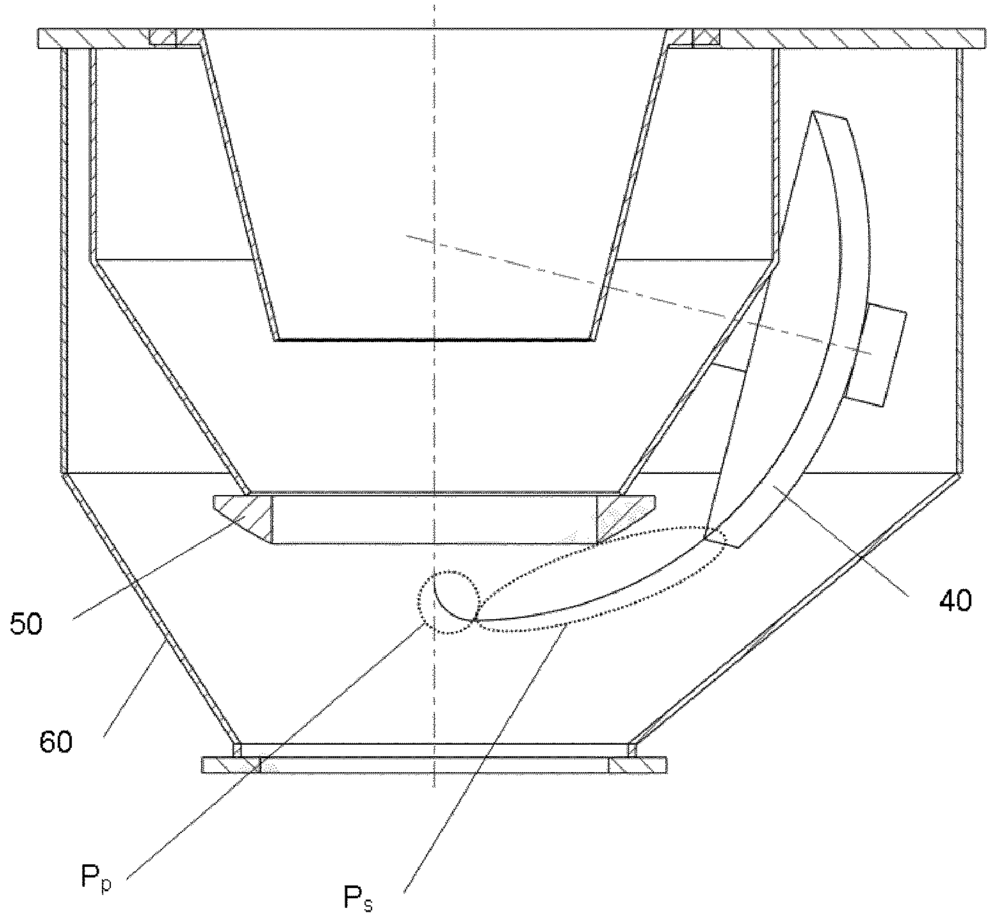
FIG. 2 is a series of partial vertical cross sectional views of an embodiment such as depicted in FIG. 1 showing the valve sealing arrangement within its casing.

The initial almost straight vertical movement of a one eccentric dual-motion mechanism as described herein is further illustrated in FIG. 2. FIG. 2 illustrates a sealing valve arrangement essentially as described in connection with FIG. 1A-C within a housing 60. The curve referenced $P_p$ and $P_s$ represents the path taken by any point of the shutter (such as its center) during primary motion ($P_p$) and secondary motion ($P_s$). As can be seen $P_p$ initially only has a vertical component, which is generally advantageous to reduce wear of the valve seat, sealing gaskets and shutter.

It is to be noted that if wear is not a (main) issue, the initial position of axis B in FIG. 1A could be chosen at a location higher or lower than axis A knowing that in such cases the initial movement will have both a vertical and an horizontal component which result in a biased unsealing of the shutter from the valve seat. By choosing an initial position which is higher than in FIG. 1A, the distance of the shutter from the valve seat will be greater, the maximum distance being twice the eccentricity (see also above).

Figure 3A:
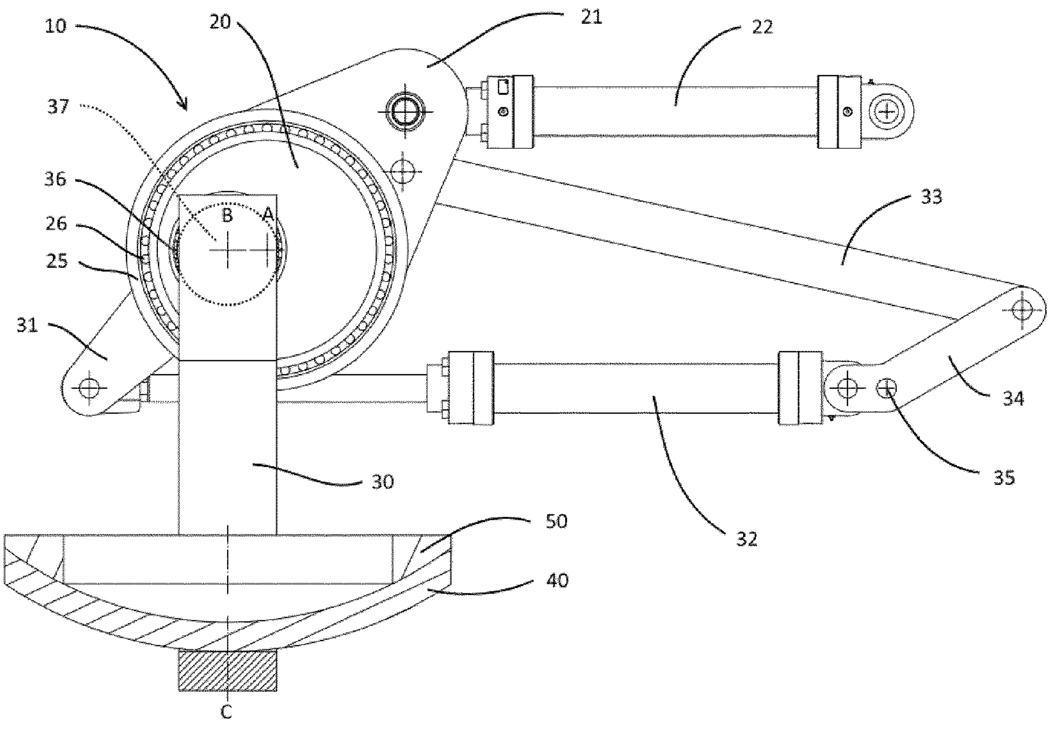
FIG. 3A-C is a series of partial vertical cross sectional views of a second embodiment of a valve sealing arrangement showing the integrated dual-motion shutter-actuating device with one eccentric sleeve shaft with a preferred arrangement of associated actuators.
Figure 3B:
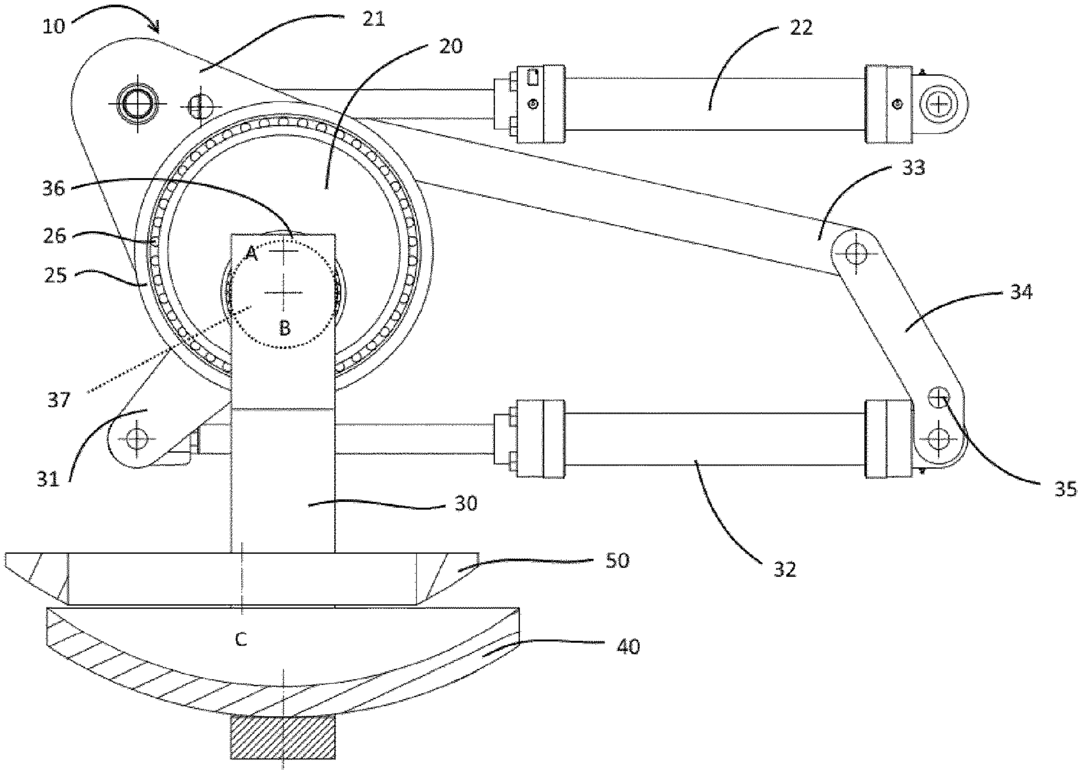
Figure 3C:
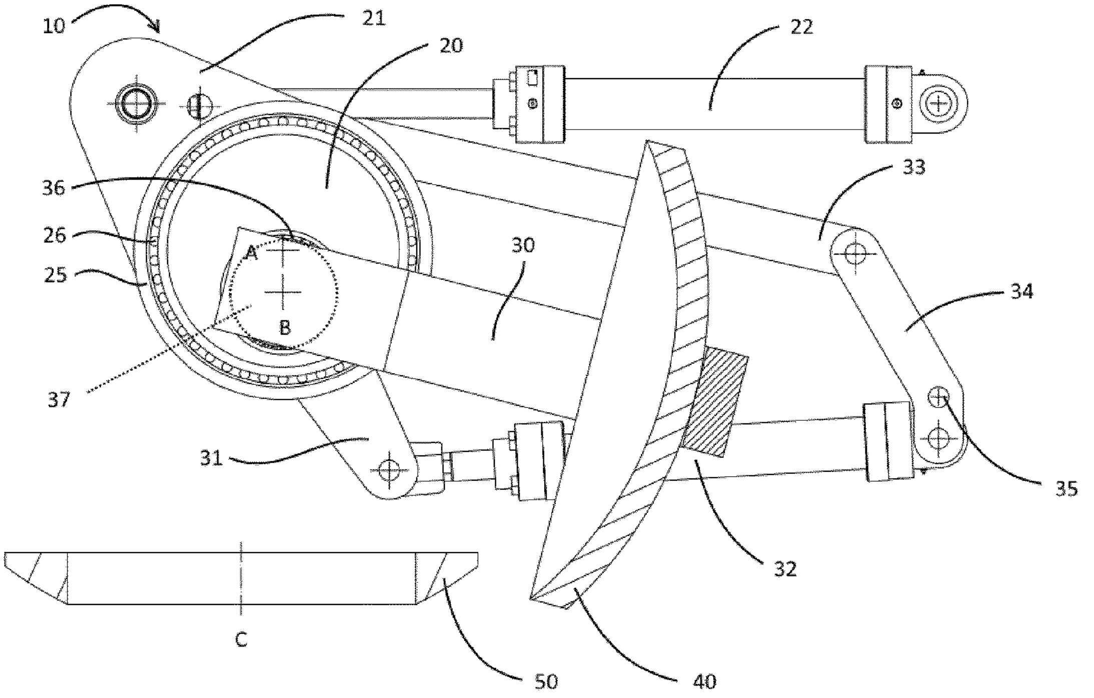

FIG. 3A-C show an arrangement similar to that of FIG. 1A-C, but with a preferred actuating mechanism. Primary motion actuator 22, e.g. a hydraulic jack, is fixed to a stationary mounting point on one end and to crank 21 on the other. By actuating actuator 22, eccentric sleeve shaft 20 is rotated to a position as illustrated in FIG. 3B. In the embodiment of FIG. 3A-C, the secondary motion (tilting) actuator 32 is connected at one end to a control rod assembly with a control rod 33, a lever 34 pivoting about a stationary point 35. The aim of the control rod assembly is to maintain the shutter arm 30 essentially vertical during the primary motion. As eccentric crank 21 is moved, control rod 33 acts on lever 34 pivoting around point 35, the lever acting on one end of actuator 32 in such a way as to keep shutter arm 30 vertical during primary motion. When primary motion is terminated, actuator 32 turns tilting shaft via tilting crank 31 to lift the shutter 40 in a parking position as illustrated in FIG. 3C.

In a non-illustrated embodiment of the sealing valve arrangement, secondary motion actuator 32 can be mounted (similarly to actuator 22) to a stationary point at one end and to tilting crank 32 at the other. It is noteworthy that maintaining the shutter arm vertically during the primary motion is not essential. Furthermore, even if desired, it can be achieved by other means such as by controlling the orientation of the tilting shaft by way of its actuator 32.

FIGS. 4A1 and B1 show a schematic cross section of a sealing valve arrangement wherein the integrated dual-motion shutter-actuating device comprises an inner 201 and an outer 202 eccentric sleeve shaft in an outer cylindrical sleeve 25. Both eccentrics have the same eccentricity. As a non-limiting example, in common sealing valve arrangements, each eccentricity will generally be chosen to be between 20 and 100 mm, preferably between 30 and 60 mm. Tilting shaft 37 connected at one end to the tilting arm 30 is rotationally held within the bore of the inner eccentric sleeve shaft 201. FIGS. 4A1 and B1 represent the position of the shutter before and after the primary motion, i.e. with the shutter in a sealed closed position in sealing contact with the valve seat (A1) and an open position unclamped from the valve seat (B1). FIGS. A2 and B2 depict the same situation as a transverse cross-section through the integrated dual-motion shutter-actuating device.

By rotating inner and outer eccentric sleeve shafts 201 and 202 simultaneously but in opposite directions the center of the tilting shaft is moved along a straight path by a distance equal to the sum of the eccentricities if each eccentric is rotated by 90° or even up to twice the sum of eccentricities if the angular rotation is 180° for each eccentric sleeve shaft.

FIG. 5A-C show an arrangement similar to that of FIG. 1A-C, but with an alternative embodiment of the integrated dual-motion shutter-actuating device. A primary motion actuator (not shown), e.g. a hydraulic jack, is fixed to a stationary mounting point on one end and to crank 21 on the other. By actuating the primary motion actuator, eccentric sleeve shaft 20 is rotated to a position as illustrated in FIG. 5B. In the embodiment of FIG. 5A-C, the secondary motion (tilting) actuator 32 is a control rod which is pivotally connected at one end to a stationary point and at the other end to the tilting shaft 37 or its associated crank 31. As eccentric crank 21 is moved, control rod 32 acts on tilting shaft 37 (via tilting crank 31) to lift the shutter 40 in a parking position as illustrated in FIG. 5C.

The invention claimed is:

1. A sealing valve arrangement for a shaft furnace charging installation, said arrangement comprising:

a shutter arranged for cooperating with a valve seat;

an integrated dual-motion shutter-actuating device for moving said shutter between a sealed closed position in sealing contact with the valve seat and an open position remote from the valve seat, said integrated dual-motion shutter-actuating device comprising:

a primary motion assembly for moving said shutter from said sealed closed position to an unclamped position wherein the shutter is released from the valve seat;

a secondary motion assembly for tilting said shutter from said unclamped position to said open position remote from the valve seat, said secondary motion assembly comprising a tilting arm carrying said shutter and connected to a tilting shaft that defines an axis of rotation and a tilting shaft actuator configured to impart an angular rotation about said axis to said tilting arm;

wherein said integrated dual-motion shutter-actuating device further comprises a stationary outer cylindrical sleeve, wherein said primary motion assembly comprises an inner eccentric sleeve shaft rotationally mounted within said outer cylindrical sleeve and a primary motion actuator configured to impart angular rotation to said inner eccentric sleeve shaft, the primary motion being a function of the eccentricity and angular rotation of the inner eccentric sleeve shaft; and wherein said tilting shaft of said secondary motion assembly is rotationally mounted within said inner eccentric sleeve shaft of said primary motion assembly, the secondary motion being a function of the angular rotation of the tilting shaft.

2. The sealing valve arrangement as claimed in claim 1, wherein the inner eccentric sleeve shaft is arranged within the outer cylindrical sleeve such that its eccentricity position is located laterally by about an eccentricity distance from the center of the outer cylindrical sleeve when the shutter is in the sealed closed position.

3. The sealing valve arrangement as claimed in claim 1, wherein said primary motion assembly further comprises an outer eccentric sleeve shaft rotationally mounted within said outer cylindrical sleeve, wherein said inner eccentric sleeve shaft is rotationally mounted within said outer eccentric sleeve shaft, the primary motion being a function of the eccentricity and angular rotation of both inner and outer eccentric sleeve shafts.

4. The sealing valve arrangement as claimed in claim 3, wherein inner and outer eccentric sleeve shafts have the same eccentricity, and wherein an eccentric actuator is configured to impart a simultaneous counter-rotating angular rotation to said inner and outer eccentric sleeve shafts.

5. The sealing valve arrangement as claimed in claim 1, wherein said tilting arm is a cantilever arm that is supported at one end portion by said tilting shaft and at another end portion carries the shutter.

6. The sealing valve arrangement as claimed in claim 1, wherein said shutter is a conical, spherical, parabolic or flap type valve shutter.

7. The sealing valve arrangement as claimed in claim 1, wherein the eccentric sleeve shaft(s) are rotationally mounted with axially spaced bearings.

* * * * *